United States Patent [19]

Inooka

[11] Patent Number: 4,486,295
[45] Date of Patent: Dec. 4, 1984

[54] PROCESSING HEAVY HYDROCARBON OILS

[75] Inventor: Masayoshi Inooka, Kanagawa, Japan

[73] Assignee: Chiyoda Chemical Engineering & Construction Co., Ltd., Yokohama, Japan

[21] Appl. No.: 301,581

[22] Filed: Sep. 14, 1981

Related U.S. Application Data

[63] Continuation of Ser. No. 82,037, Oct. 5, 1979, abandoned.

[30] Foreign Application Priority Data

Oct. 5, 1978 [GB] United Kingdom ............... 39443/78

[51] Int. Cl.³ .............................................. C10G 67/04
[52] U.S. Cl. ........................................ 208/96; 208/97; 208/212; 208/251 H
[58] Field of Search ................ 208/96, 97, 212, 251 H

[56] References Cited

U.S. PATENT DOCUMENTS 2,775,544 12/1956 Corneil et al. ................... 208/251 H
3,168,459 2/1965 Anderson et al. ..................... 208/96
3,859,199 1/1975 Gatsis ................................. 208/309
4,152,250 5/1979 Inooka et al. ................... 208/251 H

OTHER PUBLICATIONS

Kirk–Othmer Encyclopedia of Chemical Technology, 2nd ed., John Wiley and Sons, Inc., New York, 1965, vol. 8, pp. 93–99.

Primary Examiner—Winston A. Douglas
Assistant Examiner—William Leader
Attorney, Agent, or Firm—Armstrong, Nikaido, Marmelstein & Kubovcik

[57] ABSTRACT

Heavy hydrocarbon oils are processed by hydrotreatment over a sepiolite supported metal catalyst, described fuller in U.S. Pat. No. 4,152,250, whereby metallic impurities are removed from the oil and its asphaltene content is decreased, and the hydrotreated oil is solvent deasphalted using a propane, butane, pentane, hexane or heptane solvent or mixtures of these to give a deasphalted oil suitable for further treatment, e.g. hydrodesulphurization, and an asphaltic residue.

8 Claims, 5 Drawing Figures

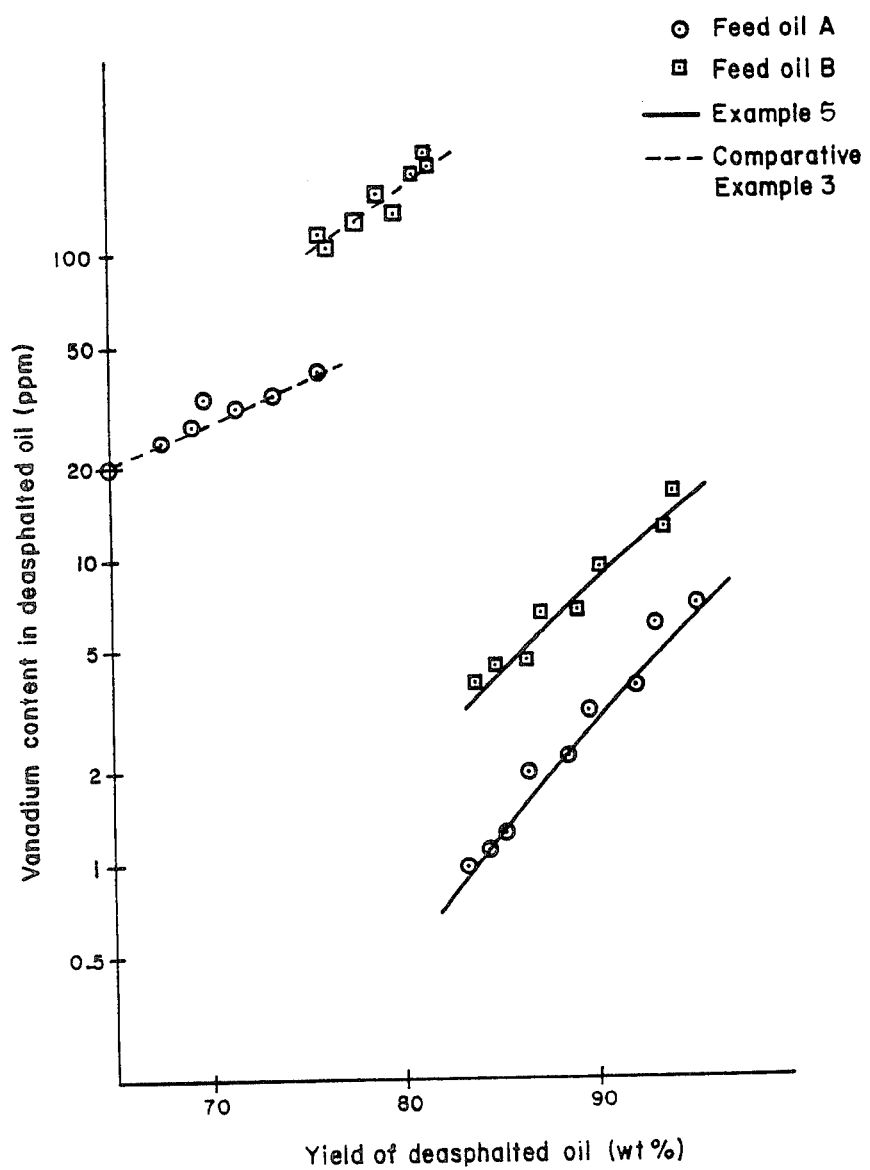

PROCESSING HEAVY HYDROCARBON OILS

This is a continuation of application Ser. No. 82,037, filed Oct. 5, 1979, now abandoned.

BACKGROUND OF THE INVENTION

The invention relates to the processing of heavy hydrocarbon oils (hereinafter abbreviated to heavy oils) and, in particular, to a method of processing heavy oils which method comprises hydrotreating the oils at high temperature under high hydrogen pressure using a catalyst containing porous magnesium silicate as a major component to demetallize and simultaneously crack asphaltene in the oil and solvent deasphalting the hydrotreated oil, and which method leads to a light oil having a low metal content and being substantially free from asphaltene, and to an asphaltic residue having a low sulphur content and a high aromatic content.

It is known to carry out solvent deasphalting of heavy oil such as crude oil, tar, bitumen, topped crude or vacuum residue. Such heavy oils usually contain metals in the form of organic metal compounds (hereinafter abbreviated to soluble metals) and asphaltenes. The solvent deasphalting divides the heavy oil into a deasphalted oil and an asphaltic residue. The deasphalted oil generally has a comparatively low soluble metals content and a remarkably high reactivity in hydrodesulphurization or denitrogenation processes as compared to that of the raw heavy oil, so that it may be easily hydrotreated.

However, when a high reactivity of demetallization is required, or deasphalted oil is to be obtained in an extremely high yield, deactivation of the catalyst by deposition of metals or formation of coke or tar is unavoidable in the hydrotreatment of the deasphalted oil, because soluble metals and a fraction corresponding to carbon residue yet remain in the deasphalted oil in spite of being free from asphaltene. Moreover, a defect of this process is that the usefulness of the asphaltic residue is limited because soluble metals, asphaltenes, sulphur and nitrogen are concentrated in it. Moreover, attempts to decrease the amount of soluble metals in the deasphalted oil in order to make feasible the subsequent treatment of the deasphalted oil, tend to lower the yield of the deasphalted oil, increasing the asphaltic residue.

It has been proposed in, for example, U.S. Pat. No. 3,859,199 to hydrodesulphurize the heavy oil prior to solvent deasphalting. In this process the asphaltic residue obtained from the solvent deasphalting step is recycled to the hydrodesulphurization step. Although the nitrogen and sulphur contents in the deasphalted oil remarkably decrease, the sulphur and nitrogen contents in the asphaltic residue do not decrease. This limits the usefulness of the asphaltic residue obtained. Moreover, the activity of the hydrodesulphurization catalyst is remarkably degraded by the soluble metals, and chemical consumption of hydrogen necessary for the desulphurization step is remarkably high. Accordingly, this process seems to be not commercially useful.

To improve the situation stated above, the inventor has developed a sepiolite supported metal catalyst for hydrotreatment, such as selective demetallization of heavy oils and has described and claimed it in U.S. Pat. No. 4,152,250. Further application and development of the catalysts, supported on the above sepiolite and other porous magnesium silicate clay minerals, have been pursued in combination with other processings of heavy oil in order to utilize effectively various heavy oils and have been led to the present invention.

SUMMARY OF THE INVENTION

This invention is based on the fact that the heavy oils hydrotreated in the presence of this catalyst have properties remarkably different from those hydrodesulphurized in the prior art treatment. The heavy oils subjected to the hydrotreatment using the porous magnesium silicate supported metal catalysts have shown that the removal of soluble metals and the cracking of asphaltenes were very selectively performed although sulfur was less removed as compared with heavy oils treated by the conventional hydrodesulfurization process.

It is also noted that in these hydrotreated oils sulfur content has been reduced in their asphaltic residue rather than in their deasphalted oils because the reduction of asphaltene is related to the sulfur removal; this is the reverse of the oils which have been hydrodesulfurized in prior art. Moreover, since soluble metals in this hydrotreated oil can be separated into a very limited amount of asphalt when processed successively in solvent deasphalting, it has become possible to obtain a high yield of deasphalted oil of far less metal contents which is unable to attain by solvent deasphalting only. Based on the unique performance of the hydrotreating described above, the inventor has found the effective and novel combination of hydrotreating and solvent deasphalting.

This invention provides a method of processing a heavy oil which method comprises (a) a hydrotreatment step in which the heavy hydrocarbon oil is hydrotreated at a hydrogen pressure of from 30 to 350 $Kg/cm^2$ and a reaction temperature of from 350° to 450° C. in the presence of a catalyst containing a catalyst metal component comprising one or more compounds of metals of Groups Ib, IIb, IIIa, Va, VIa and VIII in the periodic table according to Mendeleev supported on porous magnesium silicate as a carrier and (b) a solvent-deasphalting step in which the hydrotreated oil is further treated at a temperature of from 10° to 267° C. and a pressure of from 1 to 50 $Kg/cm^2$ with a paraffinic hydrocarbon having from 3 to 7 carbon atoms as solvent to divide it into asphaltic residue and to deasphalted oil containing substantially no asphaltene.

In methods according to the invention, the deasphalted oil is obtained in high yield due to increase of light fractions by cracking of asphaltenes and it contains extremely low amounts of soluble metals. It is thus suitable for further treatment such as hydrodesulphurization and cracking, which cause rapid degradation of catalyst activity, and hence it is possible to obtain, without difficulty, low impurity oil in high yield.

The catalyst for the hydrotreatment can be produced very cheaply compared to known hydrotreating catalysts used for ordinary hydrodesulphurization and the like, and has a high demetallizing activity and a high deasphalting activity.

For the porous magnesium silicate carrier, any of minerals occurring naturally or synthesized may be used. Among them, fibrous magnesium silicate clay minerals wherein the silicon bonds have the so-called double-chain structure as shown in "Clay Handbook", edited by Japan Clay Society in 1967, are effective. Particularly, natural clay minerals such as sepiolite, attapulgite or palygorskite are preferred. Treatment of the porous magnesium silicate and supporting of the catalyst metal can be effectively carried out according to the teachings of our U.S. Pat. No. 4,152,250. It is preferred, for reasons of catalyst activity and catalyst life, that the catalyst has an average pore diameter of from 120 Å to 3000 Å, a specific surface area of at least 5 $m^2/g$ and a pore volume of at least 0.4 cc/g. For example, a catalyst having an average pore diameter of from 120 Å to 500 Å, a specific surface area of from 50 $m^2/g$ to 200 $m^2/g$ and a pore volume of from 0.5 cc/g to 1.0 cc/g is preferred for topped crude or vacuum residue obtained from Middle East crude oil. Further, a catalyst having an average pore diameter of from 200 Å to 2000 Å and a pore volume of at least 0.7 cc/g is preferred for heavy oil having a high metal content such as Boscan crude oil or Tiajuana vacuum residue. Generally large pore diameters, high specific surface areas and high pore volumes are preferred for long catalyst life.

The preferred catalyst metal component comprises one or more compounds of copper, zinc, yttrium, lanthanide or vanadium, chromium, molybdenum or tungsten, or iron group elements. Copper, vanadium, molybdenum, tungsten and iron group metals are particularly preferred.

The optimum conditions for the hydrotreatment are selected from those given above according to the properties of a heavy oil used as a feed oil and the desired properties of the produced oil. Hydrogen consumption is $\frac{1}{2}$ to $\frac{1}{4}$ of that in hydrodesulphurization or hydrocracking reactions using the known desulphurizing catalyst and, consequently, total quantity of heat of reaction is low. Despite this, upgrading of the heavy oils by hydrocracking of asphaltenes and decrease of viscosity occurs. The low total quantity of heat of reaction enables good control of cooling in the reactor. The reaction process may suitably be for example, a fixed bed process, a moving bed process or a fluidized bed process.

The heavy oil after subjection to hydrotreatment is then solvent deasphalted to divide it into deasphalted oil and asphaltic residue. As the solvent used for the deasphalting treatment, paraffinic hydrocarbons having 3 to 7 carbon atoms are used. Moreover, the paraffinic hydrocarbon solvent need not have a particularly high purity. For example, a pentane fraction containing from 10 to 20% of a butane fraction may be used, as may petroleum ether comprising pentane, hexane and heptane as main components. Moreover, a by-product fraction from the hydrotreatment step of the method according to the invention may be used. In known solvent deasphalting treatments, solvents having 5 or more carbon atoms have not ordinarily been used, because in case of using the solvent having a large carbon atom number the yield of asphaltic residue is low, while the operation of the solvent deasphalting treatment becomes difficult and the metal content in deasphalted oil increases.

In the method according to the invention, since demetallization and cracking of asphaltene have already been effected by the hydrotreatment, deasphalted oil can be obtained in a high yield by the use of a solvent having a large carbon atom number. On the other hand, in the process of this invention the yield of deasphalted oil becomes low in the case where use is made of a solvent having a small carbon atom number such as $C_3$–$C_4$ as compared with the case where use is made of a solvent above $C_4$, but the metal content and the CCR(Conradson Carbon Residue) of the deasphalted oil thus obtained are found to be extremely small, so that the use of such a solvent is especially desirable in treating a feed oil having a high metal content for the purpose of providing a feed oil suitable for an FCC(Fluid Catalytic Cracking) process. That is to say, in an FCC process, oils whose metal content and CCR are extremely low are being eagerly demanded as the feed oil.

The properties of the deasphalted oil obtained vary according to the nature of the solvent and the treatment conditions. In the prior method, the solvent deasphalting conditions were selected in such a manner that the yield of asphaltic residue was as low as possible. According to the invention, selection of the conditions based on the yield of asphaltic residue is unecessary, because the deasphalted oil is easily obtained in high yield and the asphaltic residue can be effectively utilized. Further, since heavy oil is somewhat upgraded in the hydrotreatment by which fluidity is improved, a high solvent ratio is not often required. A high solvent ratio has been required hitherto for obtaining good fluidity in the solvent deasphalting treatment of vacuum residues. On the contrary, when the vacuum residue has been subjected to hydrotreatment according to the invention, it is possible to carry out the solvent deasphalting of the hydrotreated oil at a comparatively low solvent ratio, because the amount of asphaltenes in it is small and the molecular weight of asphaltenes has been reduced, i.e. the vacuum residue has been partially converted into lighter oils.

The solvent deasphalting treatment is preferably carried out at from 40° to 250° C. and preferably at from 15 to 40 $Kg/cm^2$. The ratio of solvent to oil may be from 1:1 to 1:20 by weight preferably from 1:1 to 1:10 by weight.

The solvent may be pentanes and/or hexanes. The solvent deasphalting step is carried out at a temperature of from 150° to 250° C. and a pressure of from 15 to 40 $Kg/cm^2$, and the ratio of solvent to hydrotreated oil of from 1 to 10 by weight.

The solvent may be propane and/or butanes. The solvent deasphalting step is carried out at a temperature of from 40° to 150° C. and a pressure of from 15 to 40 $Kg/cm^2$, and the ratio of solvent to hydrotreated oil of from 2 to 10 by weight.

A characteristic of the deasphalted oil obtained according to the invention is that it has a very low soluble metals content although it has comparatively high sulphur and nitrogen contents. Accordingly, it may be used directly as a fuel oil and is suitable as a raw material for catalytic cracking or hydrocracking. If necessary, deasphalted oil having a low sulphur content can be easily obtained by a subsequent hydrodesulphurization treatment. Since the deasphalted oil contains very low amounts of the catalytically poisonous soluble metals and asphaltenes, subsequent processing, for example hydrocracking or hydrodesulphurization, can be carried out using expensive catalysts having high activities. It is possible to use catalysts having small pore diameters and very large specific surface areas and being very active under low hydrogen pressures, for example zeolite supported noble metal catalysts. The asphaltic residue obtained according to the invention can be used directly as fuel oil of good quality, since it has a low sulphur content as compared to asphaltic residues obtained by prior methods. Moreover, the asphaltic residue is a suitable raw material for other carbon products such as petroleum coke of high quality or binder pitch since its H/C atomic ratio is low, its side chain hydrocarbon content is low and its aromatic carbon and condensed ring ratios are high.

The characteristic features of the invention as described above may be summarized as follows:

(1) Upgraded deasphalted oil can be obtained in high yields.

(2) Where the hydrotreated oil is subjected to solvent deasphalting, as the solvent used can be made of paraffinic hydrocarbons having a comparatively large carbon atom number, and the solvent ratio to oil can also be reduced, thus enabling us to minimize the apparatus, etc., so that this makes the process commercially more feasible.

(3) By solvent deasphalting the hydrotreated oil with the use of a solvent having a small carbon atom number such as $C_3$-$C_4$, a deasphalted oil having an extremely low metal content can be obtained from a feed oil having a high metal content.

(4) Both light fraction and asphaltene fraction of heavy oil can be upgraded in comparatively low consumption of catalyst as well as of hydrogen.

(5) Since the asphaltic residue obtained is lower in sulfur content than that obtained in the prior art processes, it can be used as a fuel of comparatively good quality, and moreover, because of its increased aromaticity it is also utilizable as binder pitch.

DESCRIPTION OF THE PREFERRED EMBODIMENTS

Figure 1:
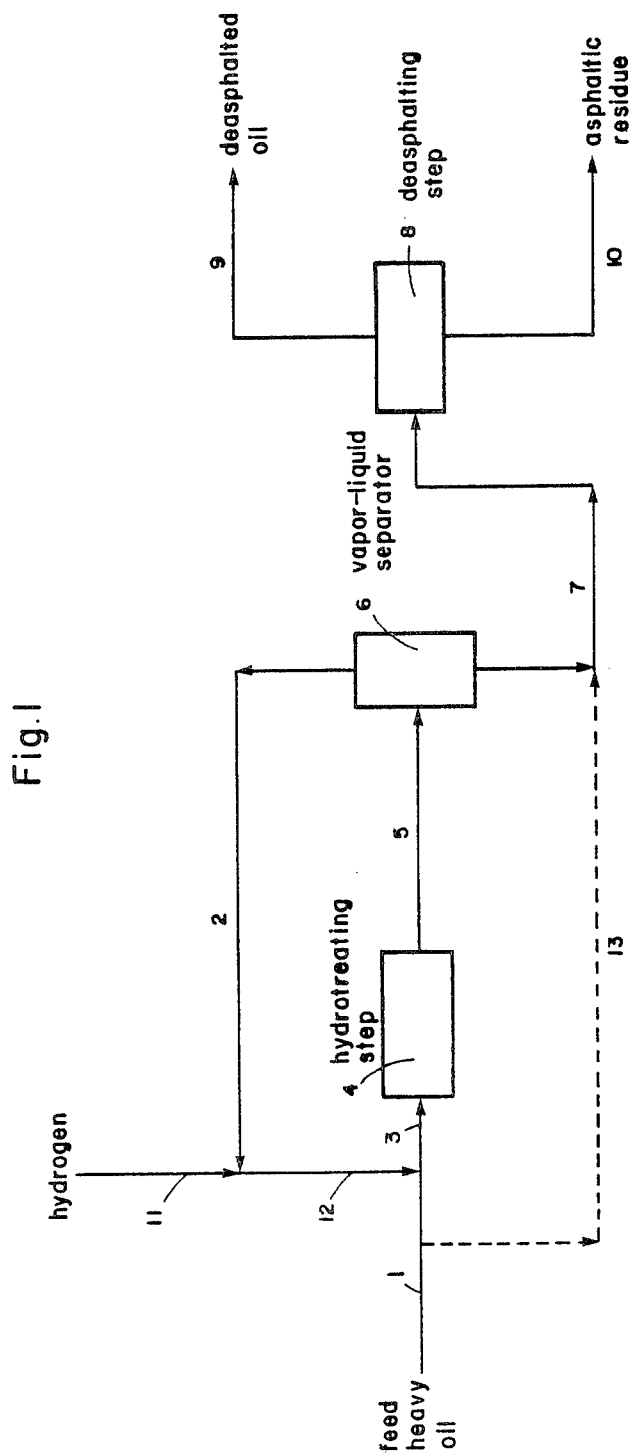
FIG. 1 shows an outline flow chart of an embodiment of the method of the present invention.

The invention is illustrated by the following Examples in which 11 parts and percentages are by weight unless otherwise stated.

EXAMPLE 1

Vacuum residue having a viscosity of 3600 centipoises at 100° C. and containing 290 ppm of vanadium, 90 ppm of nickel, 3.85% of sulphur, 0.63% of nitrogen and 9.03% of n-heptane insoluble asphalten was processed by the following steps. First, a catalyst for the hydrotreatment step was prepared by the following method. Sepiolite was milled, kneaded with addition of sufficient water, and moulded into cylindrical form of 0.8 mm diameter and dried at 200° C. The resultant mouldings were immersed in an aqueous solution of cobalt nitrate for 5 hours to support cobalt by an ion-exchange method. After sufficient washing with water and drying again at 200° C., $MoO_3$ was supported thereon by an ordinary immersion method. The catalyst was obtained by calcining at 500° C. for 2 hours and analysis showed that it contained 1.7% of CoO and 9.5% of $MoO_3$, having the following properties:

| | |
|---|---|
| Specific surface area (m²/g) (By nitrogen-absorption method) | 147 |
| Pore volume (≧ ±Å, cc/g) (By mercury porosimeter method) | 0.748 |
| Average pore diameter (Å) | 204 |

Using this catalyst, the vacuum residue was subjected to hydrotreatment at a hydrogen pressure of 140 Kg/cm², a temperature of 410° C. and a liquid space velocity of 0.25 hr$^{-1}$. When the resultant oil was analyzed after about 2000 hours from the beginning of the reaction, it contained 14 ppm of vanadium, 18 ppm of nickel, 1.37% of sulphur and 0.56% of nitrogen and had a viscosity of 478 centipoises at 100° C.

To one volume of the resultant hydrotreated oil, 10 volumes of n-heptane were added. After heating to 50° C. under normal pressure and good stirring, the mixture was filtered. The yield after separating the solvent from the filtrate was 96.3%. The deasphalted oil contained 4.5 ppm of vanadium, 5.9 ppm of nickel, 1.42% of sulphur, and 0.54% of nitrogen. Further, the asphaltic residue was obtained in a yield of 4.0% and contained 287 ppm of vanadium, 316 ppm of nickel, 2.22% of sulphur, and 1.40% of nitrogen.

EXAMPLE 2

Topped crude containing 130 ppm of vanadium, 42 ppm of nickel, 2.62% of sulphur, 0.37% of nitrogen and 2.87% of n-heptane insoluble components was used as a feed oil. First, the feed oil was subjected to hydrotreatment at a hydrogen pressure of 140 Kg/cm², a temperature of 430° C. and a liquid space velocity of 0.50 hr$^{-1}$ using the same catalyst as in Example 1. The hydrotreated oil contained 0.7 ppm of vanadium, 2.9 ppm of nickel, 0.7% of sulphur, 0.31% of nitrogen and 1.4% of n-heptane insoluble components.

To 1 volume of the hydrotreated oil, 10 volumes of n-pentane were added. After thorough stirring at normal temperature and pressure, the mixture was filtered.

The resultant deasphalted oil, after removal of the solvent, was obtained in a yield of 90.2%, and contained 0.1 ppm of vanadium, 0.3 ppm of nickel, 0.70% of sulphur, and 0.30% of nitrogen.

The yield of asphaltic residue was 8.0%, and the sulphur content thereof was 1.25%. When the same feed oil was subjected to the same deasphalting treatment without being subjected to the previous hydrotreatment the yield of asphaltic residue was 16.3% and the sulphur content thereof was 4.40%.

EXAMPLE 3

Heavy crude oil containing 1130 ppm of vanadium, 106 ppm of nickel, 5.18% of sulphur, 0.59% of nitrogen and 12.1% of n-heptane insoluble components was processed according to the invention. The hydrotreatment was carried out for 500 hours at a temperature of about 410° C., a hydrogen pressure of 140 Kg/cm² and a liquid space velocity of 0.30 hr$^{-1}$ using the same catalyst as in Example 1. The temperature was gradually raised so that the vanadium content in the hydrotreated oil was reduced to from 50 to 100 ppm.

The hydrotreated oil was deasphalted using n-heptane in the same manner as in Example 1. The resultant deasphalted oil and asphaltic residue, and the deasphalted oil and asphaltic residue obtained by solvent deasphalting treatment the feed oil without hydrotreatment as described in Example 1 were analyzed, and the results are shown in Table 1.

The remarkably reduced viscosity of the hydrotreated oil makes it more susceptible to the solvent deasphalting treatment. Further, the deasphalted oil is obtained in a high yield of 90.6% and the vanadium content is remarkably reduced to 28 ppm. The deasphalted oil obtained according to the invention is, as clearly seen from the figures given in Table 1, suitable as a raw material for hydrodesulphurization, hydrocracking and catalytic cracking. The asphaltic residue obtained according to the invention is best suited as a raw material for various kinds of carbon product, because its properties are quite different from those of the asphaltic residue obtained directly from the feed oil, notably in the almost halved molecular weight, almost doubled aromatic hydrocarbon ratio and the increased atomic ratio carbon to hydrogen.

TABLE 2-continued

| | V ppm | Ni ppm | S % | Conradson carbon residue % | n-heptane insoluble asphaltene % |
|---|---|---|---|---|---|
| Deasphalted oil | 5.5 | 5.0 | 2.96 | 4.2 | Trace |
| Asphaltic residue | 83 | 120 | 3.92 | 64 | — |

EXAMPLE 5

This Example describes continuous process applications of the invention and reference is made to FIG. 1 of the accompanying drawings, which is a flow chart of the apparatus used for the continuous process. The apparatus has a feed oil processing capacity of from 100 to 1000 cc/hr.

The heavy oil is fed through line 1 and mixed with a hydrogen rich gas supplied through line 12. The hydro-

TABLE 1

| | Properties of feed oil and produced oil | | | | | | | | | |
|---|---|---|---|---|---|---|---|---|---|---|
| | V ppm | Ni ppm | Fe ppm | S % | N % | Viscosity (centipoise at 50° C.) | Molecular weight | Aromatic hydrocarbon ratio* % | Atomic ratio of carbon to hydrogen | n-Heptane insoluble asphaltene % | Yield % |
| Feed oil | 1,130 | 106 | 4.0 | 5.18 | 0.59 | 5,600 | — | — | — | 12.1 | — |
| Feed Deasphalted oil | 670 | 63 | 4.0 | 5.23 | 0.44 | — | 512 | 5.0 | — | — | — |
| Feed Asphaltic residue | 5,550 | 459 | 100 | 7.03 | 1.00 | — | 3,250 | 8.1 | 0.857 | — | — |
| Hydrotreated oil | 81 | 25 | 0.3 | 2.15 | 0.47 | 57 | — | — | — | 3.4 | — |
| Hydrotreated Deasphalted oil | 28 | 9.0 | 0.9 | 2.12 | 0.44 | — | 375 | 4.8 | — | — | 90.6 |
| Hydrotreated Asphaltic residue | 1,630 | 464 | 52 | 3.19 | 1.70 | — | 1,713 | 15.2 | 1.028 | — | 3.2 |

*Measured by a NMR method

EXAMPLE 4

Tar sand bitumen was processed according to the invention. In the hydrotreating step, copper supported on attapulgite clay was used as catalyst. First, copper sulphate was added to powdery attapulgite clay so that the mixture contained about 2% of copper. After neutralizing by addition of a dilute aqueous solution of ammonia, the mixture was sufficiently mixed by stirring and moulded into cylindrical form of 1 mm diameter. The thus moulded forms were calcined at about 500° C. to obtain a catalyst having 180 m²/g of specific surface area, 0.912 cc/g of pore volume ($\geqq$ 35 Å) and 203 Å of average pore size. The hydrotreatment was carried out using the same apparatus as in Example 1 at a hydrogen pressure of 160 Kg/cm², a temperature of 400° C., a liquid space velocity of 0.5 hr$^{-1}$ and a ratio by volume of hydrogen at NTP to feed oil of 1000. after 500 hours from the beginning of the reaction, the hydrotreated oil was solvent deasphalted using a hexane fraction at a temperature of about 183° C., a pressure of 15 Kg/cm² and a solvent ratio of 7.0 in an autoclave. 88.0% of deasphalted oil and 5.5% of asphaltic residue were obtained from the feed oil.

Properties of the feed oil, deasphalted oil and asphaltic residue are shown in Table 2.

TABLE 2

| | V ppm | Ni ppm | S % | Conradson carbon residue % | n-heptane insoluble asphaltene % |
|---|---|---|---|---|---|
| Feed oil | 143 | 78 | 4.43 | 13.0 | 9.3 | gen rich gas is a mixture of a gas separated in a vapour-liquid separation step 6 subsequently described, this gas being fed through line 2 and supplementary hydrogen fed through line 11. The feed oil mixed with the hydrogen rich gas is introduced into a hydrotreating step 4 through line 3. The hydrotreated oil from step 4 is introduced into the vapour-liquid separator 6 through line 5. In the vapour-liquid separator 6, the hydrogen rich gas and the liquid reaction product are separated. The vapourliquid separator is operated under substantially the same pressure as that in the reactor at 150° C.

The above described liquid reaction product is introduced into a solvent-deasphalting step 8 through line 7. The deasphalting step 8 comprises a solvent extraction tower, a solvent recovery tower and an evaporation tower for removing the solvent from the deasphalted oil and the asphaltic residue, these towers being not shown in the drawing. The deasphalted oil with low asphaltene and heavy metal content is discharged from the deasphalting step 8 through line 9 and the upgraded asphaltic residue is discharged from the deasphalting step 8 through line 10.

Two kinds of heavy oil were used. Feed oil A was vacuum residue from the Middle-Near East containing 128 ppm of vanadium, 43 ppm of nickel, 11.1% of n-heptane insoluble asphaltene, 20.1% of Conradson carbon residue, 4.90% of sulphur and 0.33% of nitrogen. Feed oil B was topped crude from Venezuela containing 478 of vanadium, 107 ppm of nickel, 14.1% of n-heptane insoluble asphaltene, 17.9% of Conradson carbon residue, 4.05% of sulphur and 0.55 of nitrogen. These Feed oils A and B were subjected to the hydrotreatment and the solvent deasphalting treatment using the apparatus above described with reference to FIG. 1. The catalyst used in the hydrotreatment was prepared in the following manner. Sepiolite was milled so as to pass through a 50 mesh screen, and aluminium sulphate was then added thereto in an amount such that the mixture contained 1% of alumina. To the mixture was added about 10 times its weight of water and the mixture was mixed well. The mixture was neutralized by adding an aqueous solution of ammonia. After it was conditioned so as to have about 140% moisture content, it was extruded into cylindrical forms of about 0.5 mm diameter. After drying in air, the extruded products were calcined at 500° C. for 2 hours. 9.2% of $MoO_3$, 2.6% of CoO and 0.5% of NiO were supported on the calcined products by an ordinary immersion method, and all were further calcined at 500° C. for 2 hours to obtain a sepiolite supported molybdenum, cobalt and nickel catalyst having 171 $m^2/g$ of specific surface area, 0.790 cc/g of pore volume, and 185 Å of average pore size. The hydrotreatment step was carried out under the following conditions.

| Reaction temperature | 405° C. |
|---|---|
| Reaction pressure | 140 $Kg/cm^2$ |
| Liquid space velocity | 0.3 $hr^{-1}$ |
| Ratio of hydrogen to oil | 1000 Nl/l |

Properties of the hydrotreated oils after about 500 hours from the beginning of experiment were as follows:

| Feed oil | A | B |
|---|---|---|
| Specific gravity (D15/4° C.) | 0.978 | 0.973 |
| Vanadium (ppm) | 16.3 | 68 |
| n-Heptane insoluble asphaltene (%) | 4.4 | 3.7 |
| Sulphur component (%) | 2.51 | 2.24 |
| Nitrogen component (%) | 0.29 | 0.53 |

The hydrotreated oils were then solvent deasphalted to separate the deasphalted oils and the asphaltic residues. The solvent deasphalting step was carried out under the following conditions.

| Solvent | n-pentane |
|---|---|
| Temperature of the top of tower | 170–190° C. |
| Temperature of the bottom of tower | 160–180° C. |
| Pressure | 38 $Kg/cm^2$ |
| Solvent ratio | 2–7 |

The deasphalted oils were obtained in various yields under these conditions.

Figure 2:
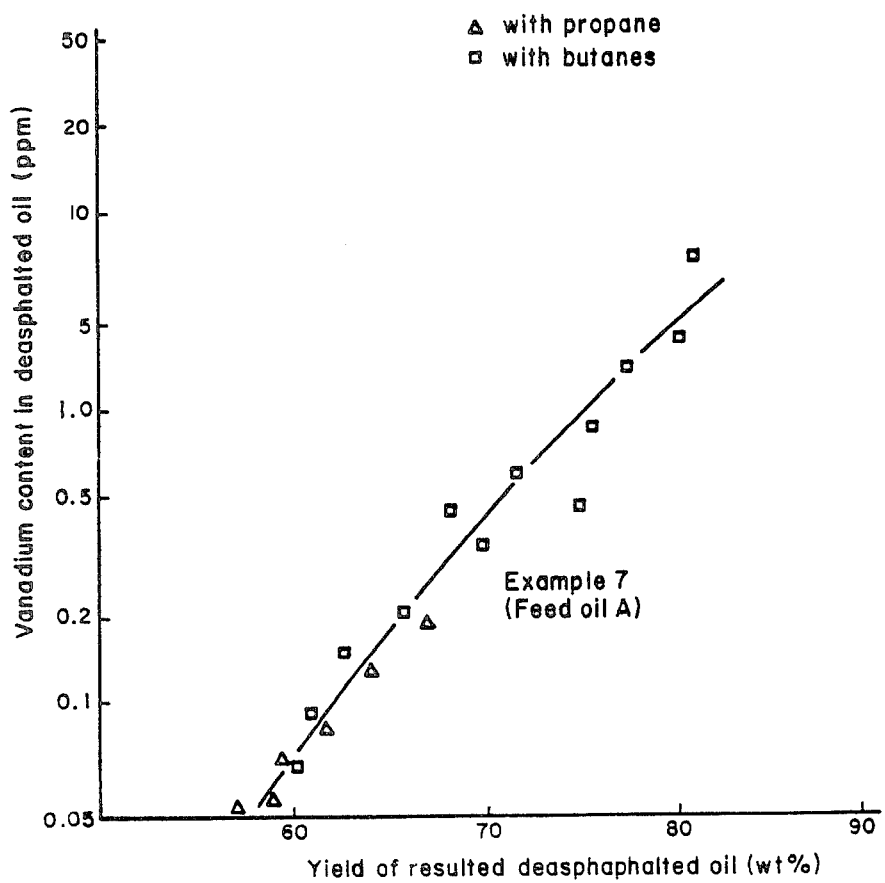
FIG. 2 shows the relations between the yield of the deasphalted oil and the vanadium content in Example 5 and Comparative Example 3, and FIG. 2' shows the relations in Example 7.

FIG. 2 of the accompanying drawings is a plot showing the relationship between the yield of the resultant deasphalted oils and the vanadium content in said deasphalted oils.

These are shown in solid lines, and FIG. 2 also shows in broken lines, the same relationship for deasphalted oils obtained in Comparative Example 3. Further, the properties of deasphalted oils and asphaltic residues obtained from Feed oil A under conditions giving a deasphalted oil yield of 85.3% and from Feed oil B under conditions giving a deasphalted oil yield of 85% are shown below.

| Feed oil | A | | B | |
|---|---|---|---|---|
| | Deasphalted oil | Asphaltic residue | Deasphalted oil | Asphaltic residue |
| Specific gravity (15/4° C.) | 0.9432 | 1.154 | 0.948 | 1.110 |
| Viscosity 100° C. (cps) | 229 | — | — | — |
| Softening point(°C.) | — | 176 | — | 163 |
| n-Heptane insoluble asphaltene (%) | Trace | 36.1 | Trace | 30.2 |
| CCR (%) | 6.2 | 41.2 | 5.4 | 36.3 |
| Vanadium (ppm) | 1.3 | 124 | 4.2 | 370 |
| Nickel (ppm) | 1.4 | 109 | 5.1 | 270 |
| Nitrogen (%) | 0.23 | 0.76 | 0.43 | 0.81 |
| Sulphur (%) | 2.24 | 4.42 | 2.14 | 3.89 |

From the above results it will be understood that deasphalted oils of good quality are obtained in high yield.

In a further experiment, hydrotreatment of Feed oil A was carried out at a reaction temperature of from 360° to 410° C., a reaction pressure of 140 $Kg/cm^2$, a liquid space velocity of from 0.2 to 1 $hr^{-1}$ and a hydrogen to oil ratio of 1000 Nl/l. The solvent deasphalting step was carried out under the conditions above described.

Figure 3:
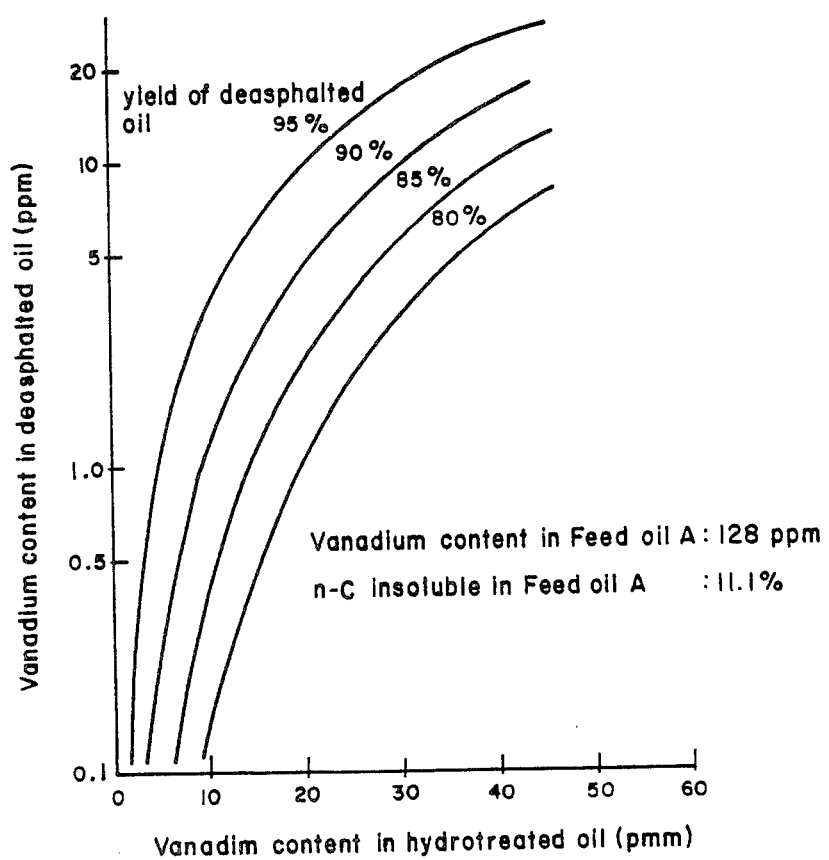
FIG. 3 shows the relations between the yield of the deasphalted oil according to the present invention and vanadium contents in the hydrotreated oil and the deasphalted oil.

FIG. 3 of the accompanying drawings is a plot showing the relationship between the vanadium content in the hydrotreated oil and the vanadium content in the deasphalted oil as a function of the yield of the deasphalted oil. It will be clear from this Figure that the properties of the deasphalted oil can be suitably adjusted by varying the conditions of the hydrotreatment step.

EXAMPLE 6

Using the Feed oil A shown in Example 5, the procedure in Example 5 was repeated except that the solvent deasphalting treatment was carried out under the following conditions.

| Solvent deasphalting conditions | |
|---|---|
| Solvent composition: | |
| Pentane | 19 wt % |
| Hexane | 80 wt % |
| Heptane | 1 wt % |
| Temperature: | |
| Top of tower | 221° C. |
| Bottom of tower | 208° C. |
| Pressure: | 39 $Kg/cm^2$ |
| Solvent ratio: | 6 |

The properties of the deasphalted oil and the asphaltic residue thus obtained are as follows.

In addition, the yield of the deasphalted oil was 92 wt%, and even when such a high yield was achieved, the operation was still found to be so extremely stable that no trouble arose in the treatment.

| Properties of products | | |
| --- | --- | --- |
|  | Deasphalted oil | Asphaltic residue |
| Specific gravity (15/4° C.) | 0.9560 | 1.197 |
| Viscosity 100° C. (cps) | 430 | — |
| Softening point (°C.) | — | 186 |
| n-Heptane-insoluble asphaltene (wt %) | 0.04 | 61.3 |
| CCR (ppm) | 7.9 | 62.0 |
| Vanadium (ppm) | 5.3 | 154 |
| Nickel (ppm) | 3.3 | 127 |
| Nitrogen (wt %) | 0.27 | 0.78 |
| Sulphur (wt %) | 2.77 | 4.63 |

As clearly seen from the above result, it is obvious that when a hexane-rich solvent is used as solvent, far greater amounts of upgraded deasphalted oil can be obtained in a high yield as compared with the conventional process, though it is somewhat inferior, from the viewpoint of the vanadium content, etc. to the above Example 5, in which pentene was used as solvent.

EXAMPLE 7

In this Example, hydrotreatment of Feed Oil B, described in Example 5, was carried out under the same conditions as in Example 5. The resultant hydrotreated oil was then solvent deasphalted using propane and butanes respectively as the solvent under the following conditions.

| | |
| --- | --- |
| Temperature of the top of tower | 65–135° C. |
| Temperature of the bottom of tower | 60–125° C. |
| Pressure | 38 Kg/cm$^2$ |
| Solvent ratio | 2–10 |

Operational factors which affect the yield of deasphalted oil in ordinary solvent deasphalting treatments are the nature of the solvent, the ratio of the solvent to the oil and the temperature in the tower. Pressure in the tower is only necessary for maintaining a substantially liquid phase in the tower and hardly influences the yield.

In this Example, the treatment was begun under the conditions for a low yield, and the temperature in the tower was reduced and the solvent ratio was reduced so as to increase gradually the yield.

Deasphalted oils were obtained in from 56 to 65% and from 56 to 81% yield for propane and butanes respectively.

In this Example, as shown in FIG. 2' propane and butane were used, respectively, as the solvent in the deasphalting step, so that the flooding phenomenon rendered difficult a continuous operation, and as a result the yield of the deasphalted oil could not be increased above 65% or 81%, with propane and butanes, respectively. But, as clearly seen from FIG. 2', in this Example a deasphalted oil whose vanadium content is less than 0.5 ppm could be readily obtained. Thus, these low metal-containing deasphalted oils in which not only V but also Ni and CCR were present in lesser amounts were extremely suitable as the feed oil to FCC process.

COMPARATIVE EXAMPLE 1

The vacuum residue described in Example 1 was solvent deasphalted without being subjected to hydrotreatment. The deasphalted oil obtained in 91.0% yield contained 180 ppm of vanadium, 63 ppm of nickel, 3.53% of sulphur and 0.56% of nitrogen. The asphaltic residue obtained in 9.0% yield, contained 1190 ppm of vanadium, 480 ppm of nickel, 5.89% of sulphur and 1.30% of nitrogen.

COMPARATIVE EXAMPLE 2

Example 5 was repeated, but the catalyst for the hydrotreatment step was replaced by a conventional residual oil hydrodesulphurization catalyst having the following properties:

| | |
| --- | --- |
| Carrier: | Alumina |
| MoO$_3$ | 14.8% |
| CoO | 3.8% |
| NiO | 1.7% |
| Cylindrical form of | 0.79 mm diameter |
| Specific surface area | 213 m$^2$/g |
| Pore volume | 0.6 cc/g |

Figure 4:
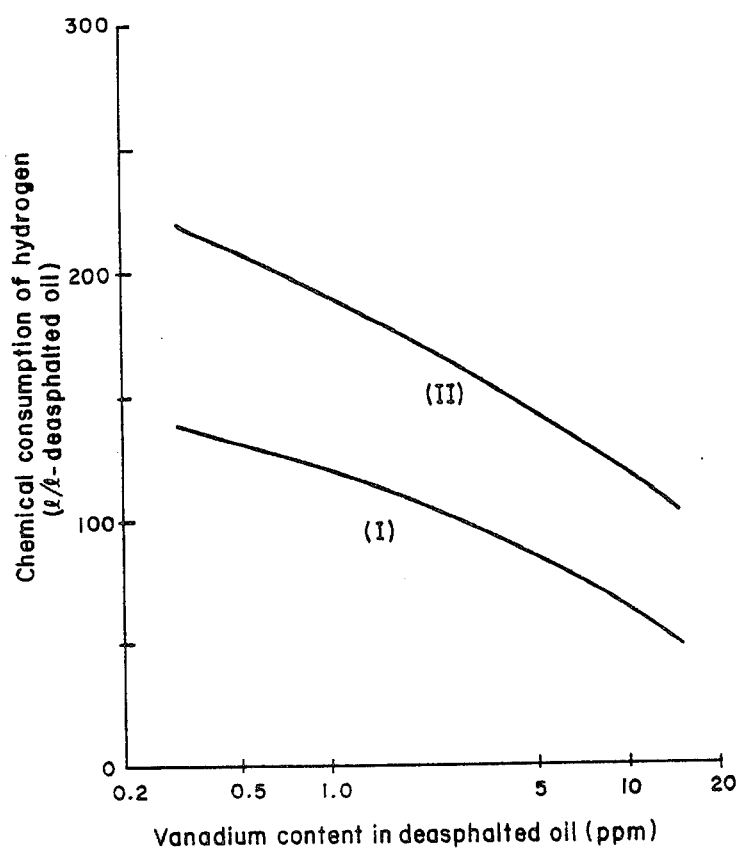
FIG. 4 shows the relations between the vanadium contents in the deasphalted oils according to Comparative Example 2 and the present invention and the chemical consumption of hydrogen in the hydrotreatment.

Deasphalted oils were obtained in 90% yield. The relationship between the vanadium contents of the deasphalted oils and the chemical consumption of hydrogen is shown by plot (II) in FIG. 4 of the accompanying drawings. The corresponding relationship for deasphalted oils obtained in Example 5 is shown by plot (I) in FIG. 4. It will be seen that, although deasphalted oils having low vanadium contents can be obtained when conventional hydrodesulphurization catalysts are used, the chemical consumption of hydrogen is lower when methods according to the invention are followed. Thus the method according to the invention is more economical. Furthermore, it will be seen in the Reference Example hereinbelow that the asphaltic residue obtained in this Comparative Example is not as good for making pitch as that obtained in Example 5.

COMPARATIVE EXAMPLE 3

In this Comparative Example the apparatus described in Example 5 with reference to FIG. 1 was used. However, the feed oil was not subjected to the hydrotreatment step 4 but was introduced directly into the solvent deasphalting step 8 through line 13 and the line 7.

The feed oils used were Feed oils A and B as described in Example 5. The solvent deasphalting step was carried out under the same conditions as in Example 5.

The relationship between the yields and vanadium contents of the deasphalted oils obtained are shown by the broken line plots in FIG. 2. It can be seen that the yields and vanadium contents of the deasphalted oils obtained according to the invention in Example 5 are superior to those of the deasphalted oils obtained in this Comparative Example.

Attempts were made, by altering the solvent deasphalting step conditions, to increase the yield of deasphalted oils. However the resultant asphaltic residue caused a blocking phenomenon in the pipes of the apparatus because its viscosity was too high, and a flooding phenomenon in which the asphaltic residue flowed out from the top of the power occurred, rendering the operation impossible. Accordingly, it was concluded that it was not commercially viable to obtain deasphalted oil in high yield by the methods of this Comparative Example.

REFERENCE EXAMPLE

Asphaltic residues were subjected to heat treatment to produce pitch. The heat treatment was carried out in an autoclave at a reaction temperature of 430° C. and a pressure of 40 Kg/cm² for 1 hour under a nitrogen atmosphere. The asphaltic residues used were (i) a residue from Example 5, Feed oil A, under conditions giving 85.3% yield of deasphalted oil, (ii) a residue from Comparative Example 3 (no hydrotreatment) under conditions giving 76% yield of deasphalted oil and (iii) a residue from Comparative Example 2 (conventional hydrodesulphurization catalyst) under conditions giving 90% yield of deasphalted oil. Properties of each resultant pitch are shown in Table 3.

Requirements for binder pitch for iron manufacturing are low sulphur and vanadium content, high aromaticity, low quinoline insoluble component content and high n-heptane insoluble component content. It will be clear from Table 3 that the asphaltic residue (i) obtained according to the invention is a raw material for excellent binder pitch.

TABLE 3

| Asphaltic residue | Properties of pitch | | |
|---|---|---|---|
| | (i) | (ii) | (iii) |
| Volatile component (%) | 35.4 | 35.0 | 34.6 |
| Softening point (°C.) | 212 | 215 | 186 |
| H/C (atomic ratio) | 0.732 | 0.751 | 0.803 |
| n-Heptane Insolubles (%) | 87.2 | 87.0 | 78.4 |
| Benzene Insolubles (%) | 33.9 | 62.2 | 30.3 |
| Quinoline Insolubles (%) | 13.6 | 28.3 | 21.2 |
| V content (ppm) | 94 | 550 | 270 |
| S content (%) | 4.75 | 7.86 | 6.27 |

I claim:

1. A method of processing a heavy hydrocarbon oil which consists essentially of the steps of (a) hydrotreating the heavy hydrocarbon oil with a hydrogen rich gas at a hydrogen pressure of from 30 to 350 Kg/cm² and a reaction temperature of from 350° to 450° C. in the presence of a catalyst containing a catalytic metal component comprising one or more metals of Groups Ib, IIb, IIIa, Va, VIa and VIII in the periodic table according to Mendeleev supported on, as a carrier, porous magnesium silicate selected from the group consisting of sepiolite, attapulgite and palygoskite to obtain a hydrotreated oil, (b) separating the hydrotreated oil from the hydrogen rich gas, and (c) contacting the hydrotreated oil at a temperature of from 10° to 267° C. and a pressure of from 1 to 50 Kg/cm² with a paraffinic hydrocarbon having from 3 to 7 carbon atoms as a solvent to divide it into an asphaltic residue and a deasphalted oil containing substantially no asphaltene.

2. A method according to claim 1 in which the catalyst has an average pore diameter of from 120 to 3000 Å, a specific surface area of at least 5 m²/g and a pore volume of at least 0.4 cc/g.

3. A method according to claim 1 or 2 in which the magnesium silicate is a clay mineral having a double-chain structure.

4. A method according to claim 1 in which the catalyst metals component comprises one or more metal of copper, zinc, yttrium, vanadium, chromium, molybdenum, tungsten, iron, cobalt, nickel or a lanthanide metal.

5. A method according to claim 1 in which the solvent is pentanes and/or hexanes.

6. A method according to claim 5 in which the solvent-deasphalting step is carried out at a temperature of from 150° to 250° C. and a pressure of from 15 to 40 Kg/cm², and the ratio of solvent to hydrotreated oil of from 1 to 10 by weight.

7. A method according to claim 1, in which the solvent is propane and/or butanes.

8. A method according to claim 7 in which the solvent-deasphalting step is carried out at a temperature of from 40° to 150° C. and a pressure of from 15–40 Kg/cm², and the ratio of solvent to hydrotreated oil of from 2 to 10 by weight.

* * * * *